US012590604B2

(12) United States Patent
Tokunaga et al.

(10) Patent No.: US 12,590,604 B2
(45) Date of Patent: Mar. 31, 2026

(54) SLIDING COMPONENT

(71) Applicant: EAGLE INDUSTRY CO., LTD.,
Tokyo (JP)

(72) Inventors: Yuichiro Tokunaga, Tokyo (JP);
Takeshi Hosoe, Tokyo (JP); **Hikaru
Katori**, Tokyo (JP)

(73) Assignee: EAGLE INDUSTRY CO., LTD.,
Tokyo (JP)

( * ) Notice: Subject to any disclaimer, the term of this
patent is extended or adjusted under 35
U.S.C. 154(b) by 0 days.

(21) Appl. No.: 18/685,177

(22) PCT Filed: Aug. 22, 2022

(86) PCT No.: PCT/JP2022/031495
§ 371 (c)(1),
(2) Date: Feb. 20, 2024

(87) PCT Pub. No.: WO2023/027003
PCT Pub. Date: Mar. 2, 2023

(65) Prior Publication Data
US 2024/0344561 A1 Oct. 17, 2024

(30) Foreign Application Priority Data
Aug. 25, 2021 (JP) ................................. 2021-137306

(51) Int. Cl.
*F16C 17/04* (2006.01)
*F16C 33/10* (2006.01)
*F16J 15/34* (2006.01)
(52) U.S. Cl.
CPC .......... *F16C 33/107* (2013.01); *F16C 17/045*
(2013.01); *F16J 15/3412* (2013.01)

(58) Field of Classification Search
CPC ...... F16C 17/045; F16C 33/107; F16C 33/74;
F16J 15/34; F16J 15/3412; F16J 15/3416;
F16J 15/342
See application file for complete search history.

(56) References Cited

U.S. PATENT DOCUMENTS 2,362,667 A * 11/1944 Schmidt .................. F04D 5/001
310/90
3,499,653 A 3/1970 Gardner et al. ......... F16J 16/16
(Continued)

FOREIGN PATENT DOCUMENTS

CN 1167890 9/2004
CN 103470771 A 12/2013
(Continued)

OTHER PUBLICATIONS

WO2020129846_A1_DESCRIPTION.*
(Continued)

*Primary Examiner* — Phillip A Johnson
(74) *Attorney, Agent, or Firm* — HAYES SOLOWAY P.C.

(57) ABSTRACT

There is provided a sliding component disposed at a relative
rotational location of a rotating machine to slide relative to
another sliding component. The sliding component has a
sliding surface provided with a fluid inlet groove commu-
nicating with at least one of a sealed fluid side space and a
leakage side space and a dynamic pressure generation
groove communicating with the fluid inlet groove and
extending in a circumferential direction. Both side edges and
a terminating end edge of the dynamic pressure generation
groove are curvedly continuous with each other in a plan
view.

14 Claims, 12 Drawing Sheets

(56) References Cited

U.S. PATENT DOCUMENTS

| | | | | | |
|---|---|---|---|---|---|
| 4,615,231 | A | * | 10/1986 | Takahashi | F16H 57/082 |
| | | | | | 184/6.12 |
| 5,224,714 | A | | 7/1993 | Kimura et al. | |
| 5,529,318 | A | | 6/1996 | Fuse et al. | 277/96.1 |
| 5,602,945 | A | * | 2/1997 | Davis | B02C 2/00 |
| | | | | | 384/368 |
| 2005/0263963 | A1 | | 12/2005 | Lai | |
| 2016/0252182 | A1 | | 9/2016 | Itadani et al. | |
| 2017/0234431 | A1 | | 8/2017 | Katori et al. | F16J 15/3412 |
| 2018/0073394 | A1 | | 3/2018 | Tokunaga et al. | F01D 25/183 |
| 2020/0056949 | A1 | | 2/2020 | Staton et al. | F16C 17/04 |
| 2020/0056956 | A1 | | 2/2020 | Yoshida et al. | F16C 33/107 |
| 2022/0120313 | A1 | | 4/2022 | Ou et al. | F16C 17/024 |
| 2022/0120315 | A1 | | 4/2022 | Ou | F16C 17/045 |
| 2022/0196152 | A1 | | 6/2022 | Imura | |

FOREIGN PATENT DOCUMENTS

| | | | | |
|---|---|---|---|---|
| CN | 205877198 U | 1/2017 | | |
| CN | 107489770 A | 12/2017 | | |
| JP | S4933614 | 9/1974 | | F16J 15/34 |
| JP | H7260009 | 10/1995 | | F16J 15/34 |
| JP | 6444492 | 12/2018 | | F16J 15/34 |
| JP | 20201730220 | 10/2020 | | F16J 15/34 |
| WO | WO2015090881 A1 | 6/2015 | | |
| WO | 2016035860 | 3/2016 | | F16J 15/34 |
| WO | 2020129846 | 6/2020 | | F16C 17/04 |
| WO | 2020130087 | 6/2020 | | F16J 15/34 |
| WO | 2020162348 | 8/2020 | | F16C 17/04 |
| WO | 2020166588 | 8/2020 | | F16C 17/04 |

OTHER PUBLICATIONS

WO2020166588_A1_DESCRIPTION.*
U.S. Appl. No. 18/686,260, filed Feb. 23, 2024, Tokunaga et al.
International Search Report and Written Opinion issued in PCT/JP2022/031495, dated Oct. 25, 2022, with English translation, 13 pages.
International Preliminary Report on Patentability issued in PCT/JP2022/031495, dated Feb. 27, 2024, 5 pages.
International Search Report and Written Opinion issued in PCT/JP2022/031493, dated Nov. 1, 2022, With English translation, 13 pages.
International Preliminary Report on Patentability issued in PCT/JP2022/031493, dated Feb. 27, 2024, 5 pages.

* cited by examiner

SLIDING COMPONENT

TECHNICAL FIELD

The present invention relates to a sliding component, for example, a sliding component used for a shaft sealing device that seals a gap between a rotating shaft and a casing of a rotating machine.

BACKGROUND ART

As a shaft sealing device that prevents a leakage of a sealed fluid around a rotating shaft of a rotating machine, for example, there is known a mechanical seal including a pair of sliding components having an annular shape which rotate relative to each other and of which sliding surfaces slide against each other. In such a mechanical seal, in recent years, there has been a demand for reducing sliding-induced energy loss for environmental measures and the like, and a sliding surface of a sliding component may be provided with positive pressure generation grooves which communicate with a sealed fluid side and of which one ends are closed in the sliding surface.

For example, in a mechanical seal illustrated in Patent Citation 1, on a sliding surface of one sliding component, a plurality of positive pressure generation mechanisms, each including a fluid inlet groove extending in a radial direction, communicating with a sealed fluid side, and not communicating with a leakage side and a positive pressure generation groove communicating with the fluid inlet groove and extending in a relative rotation direction, are provided in a circumferential direction with land portions interposed therebetween. According to this configuration, during relative rotation of sliding components, a sealed fluid is introduced into the positive pressure generation groove through the fluid inlet groove, and the sealed fluid concentrates on a wall portion of an end portion of the positive pressure generation groove in the relative rotation direction to generate a positive pressure, so that sliding surfaces are separated from each other, and a fluid film of the sealed fluid is formed between the sliding surfaces. Therefore, lubricity is improved and low friction is realized.

CITATION LIST

Patent Literature

Patent Citation 1: JP 6444492 B2 (Page 12, FIG. 7)

SUMMARY OF INVENTION

Technical Problem

In the sliding component of Patent Citation 1, the sealed fluid flows along a pair of side surfaces of the positive pressure generation groove, and then is supplied from a terminating end surface and the vicinity of the terminating end surface into a gap between the sliding components, so that low friction between the sliding components can be realized. However, in the sliding component as disclosed in Patent Citation 1, since corner portions forming a substantially right angle are formed at boundary portions between the side surfaces and the terminating end surface forming the positive pressure generation groove, and a vortex occurs in the vicinities of the corner portions when the sealed fluid moves from the fluid inlet groove toward a terminating end portion of the positive pressure generation groove, portions where the flow of the sealed fluid is less likely to occur are formed at the corner portions, and contamination contained in the sealed fluid stagnates and accumulates at the portions, which is a risk. The contamination accumulated at the corner portions of the positive pressure generation groove affects the performance of the positive pressure generation groove or easily causes abrasive wear and causes damage to the sliding surfaces, which is a risk. Incidentally, in this specification, "contami" is an abbreviation for contamination, and means "particulate foreign matter" such as fine-grained conductive foreign matter.

The present invention has been made in view of such problems, and an object of the present invention is to provide a sliding component capable of discharging contamination into a gap between sliding surfaces.

Solution to Problem

In order to solve the foregoing problems, according to the present invention, there is provided a sliding component which is disposed at a relative rotational location of a rotating machine to slide relative to another sliding component, the sliding component having a sliding surface provided with: a fluid inlet groove communicating with at least one of a sealed fluid side space and a leakage side space; and a dynamic pressure generation groove communicating with the fluid inlet groove and extending in a circumferential direction, wherein both side edges and a closing end edge of the dynamic pressure generation groove are curvedly continuous with each other in a plan view. According to the aforesaid feature of the present invention, when a positive pressure is generated in the dynamic pressure generation groove, since a fluid smoothly moves at a closing end portion of the dynamic pressure generation groove along a curved portion where both the side edges and the closing end edge are continuous with each other, and flows out from the closing end edge and the vicinity of the closing end edge into a gap between sliding surfaces, contamination contained in the fluid can be discharged into the gap between the sliding surfaces without accumulating at the closing end portion of the dynamic pressure generation groove.

It may be preferable that side surfaces of the dynamic pressure generation groove extending from the side edges in a depth direction and a closing end surface of the dynamic pressure generation groove extending from the closing end edge in the depth direction are curvedly continuous with each other. According to this preferable configuration, since the side surfaces extending from the side edges in the depth direction and the closing end surface extending from the closing end edge in the depth direction are curvedly continuous with each other, the fluid can be smoothly moved in the depth direction of the closing end portion of the dynamic pressure generation groove.

It may be preferable that both the side surfaces and the closing end surface are continuous with each other through a curved surface having a curvature radius in a plan view. According to this preferable configuration, contamination can be smoothly moved along the curved surface having one curvature.

It may be preferable that the closing end surface is a curved surface having a curvature radius. According to this preferable configuration, contamination can be smoothly moved along the closing end surface having one curvature.

It may be preferable that the closing end surface and a bottom surface of the dynamic pressure generation groove are curvedly continuous with each other in a cross-sectional view. According to this preferable configuration, in the vicinity of the closing end surface, since the movement of the fluid toward a sliding surface side is guided by the bottom surface, contamination is easily discharged into the gap between the sliding surfaces.

It may be preferable that the fluid inlet groove communicates with the sealed fluid side space, and the sliding surface is further provided with a spiral groove communicating with the leakage side space and not communicating with the sealed fluid side space. According to this preferable configuration, since a fluid on the leakage side is supplied into the gap between the sliding surfaces by the spiral groove, the movement of contamination, which is discharged into the gap between the sliding surfaces, to the leakage side space is suppressed.

DESCRIPTION OF EMBODIMENTS

Figure 1:
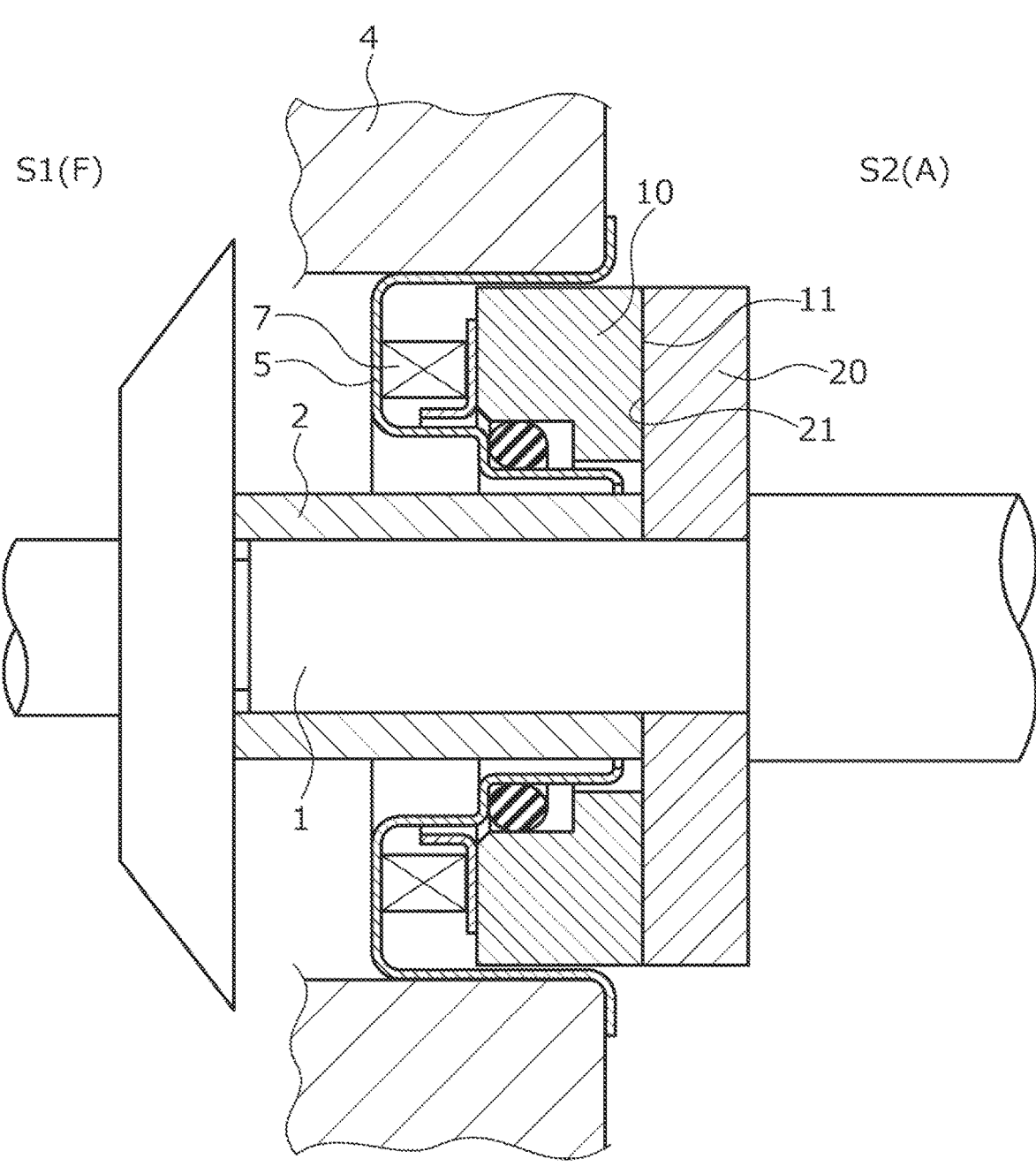
FIG. 1 is a longitudinal sectional view illustrating one example of a mechanical seal including a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 5. Incidentally, in the present embodiment, a description will be made based on the fact that a sealed fluid F exists in an inner space S1 of the mechanical seal, atmosphere A exists in an outer space S2, a radially inner side of sliding components forming the mechanical seal is a sealed fluid side (high-pressure side), and a radially outer side is a leakage side (low-pressure side). In addition, for convenience of description, in the drawings, dots may be added to grooves and the like formed on a sliding surface.

A mechanical seal for an automobile illustrated in FIG. 1 is an outside mechanical seal that seals the sealed fluid F in the inner space S1 which tends to leak from the radially inner side toward the radially outer side of sliding surfaces, and that allows the outer space S2 to communicate with the atmosphere A. Incidentally, in the present embodiment, a mode in which the sealed fluid F is a high-pressure liquid and the atmosphere A is a gas having lower pressure than the sealed fluid F will be provided as an example.

The mechanical seal mainly includes a rotating seal ring 20 as the other sliding component, and a stationary seal ring 10 as one sliding component. The rotating seal ring 20 has an annular shape, and is provided on a rotating shaft 1 so as to be rotatable together with the rotating shaft 1 via a sleeve 2. The stationary seal ring 10 has an annular shape, and is provided on a seal cover 5 fixed to a housing 4 of an attached device, so as to be non-rotatable and movable in an axial direction. The stationary seal ring 10 is biased in the axial direction by an elastic member 7, so that a sliding surface 11 of the stationary seal ring 10 and a sliding surface 21 of the rotating seal ring 20 come into close contact with and slide against each other. Incidentally, the sliding surface 21 of the rotating seal ring 20 is a flat surface, and a recessed portion such as a groove is not provided on the flat surface.

The stationary seal ring 10 and the rotating seal ring 20 are typically made of SiC (as an example of hard material) or a combination of SiC and carbon (as an example of soft material), but are not limited thereto, and any sliding material can be applied as long as the sliding material can be used as a sliding material for a mechanical seal. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN, and as carbon, mixed carbon of a carbonaceous substance and a graphitic substance, resin-molded carbon, sintered carbon, and the like can be used. In addition, in addition to the above-described sliding materials, metal materials, resin materials, surface modification materials (e.g., coating materials), composite materials, and the like can also be applied.

Figure 2:
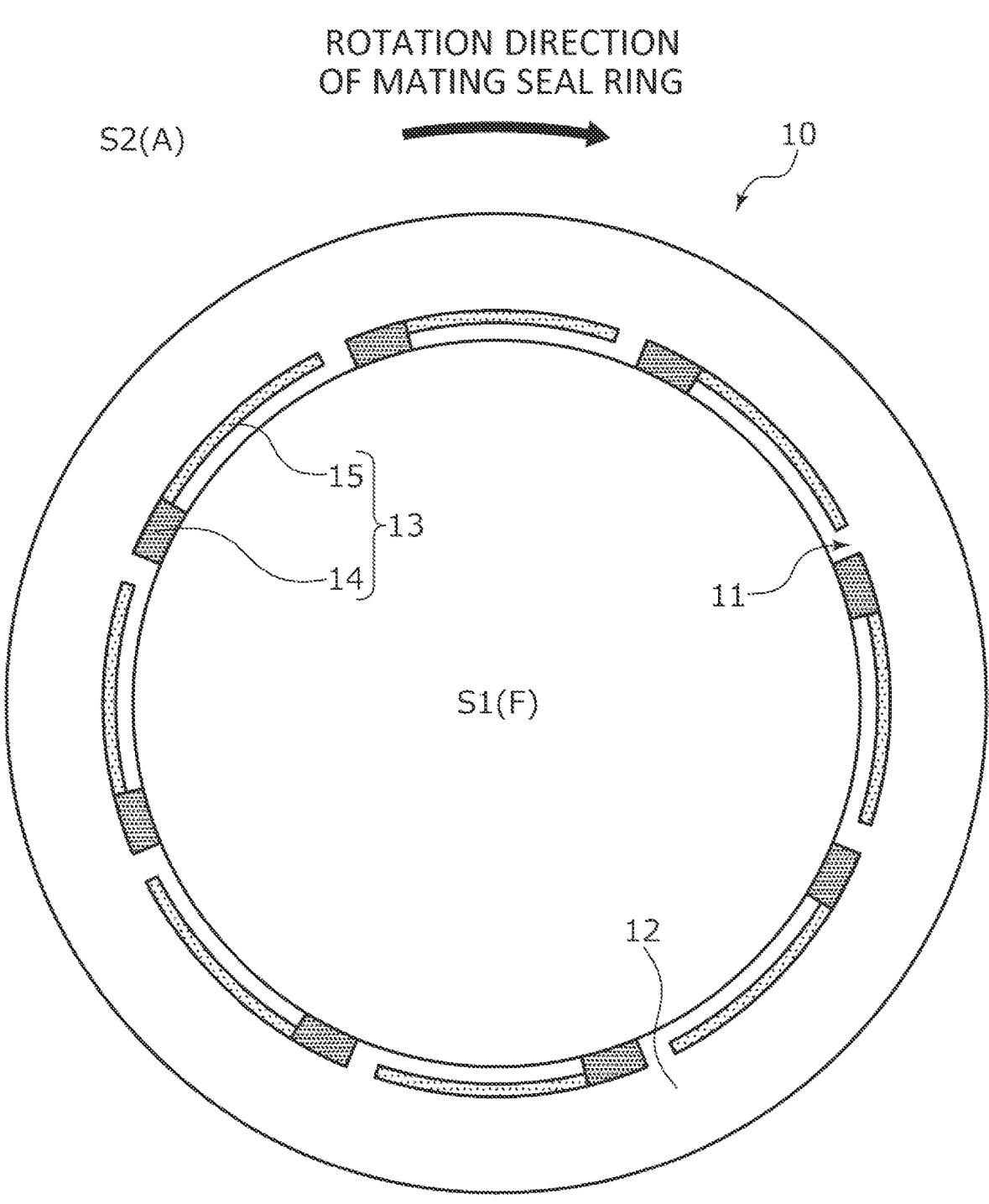
FIG. 2 is a view of a sliding surface of a stationary seal ring in the first embodiment when viewed in an axial direction.
Figure 3:
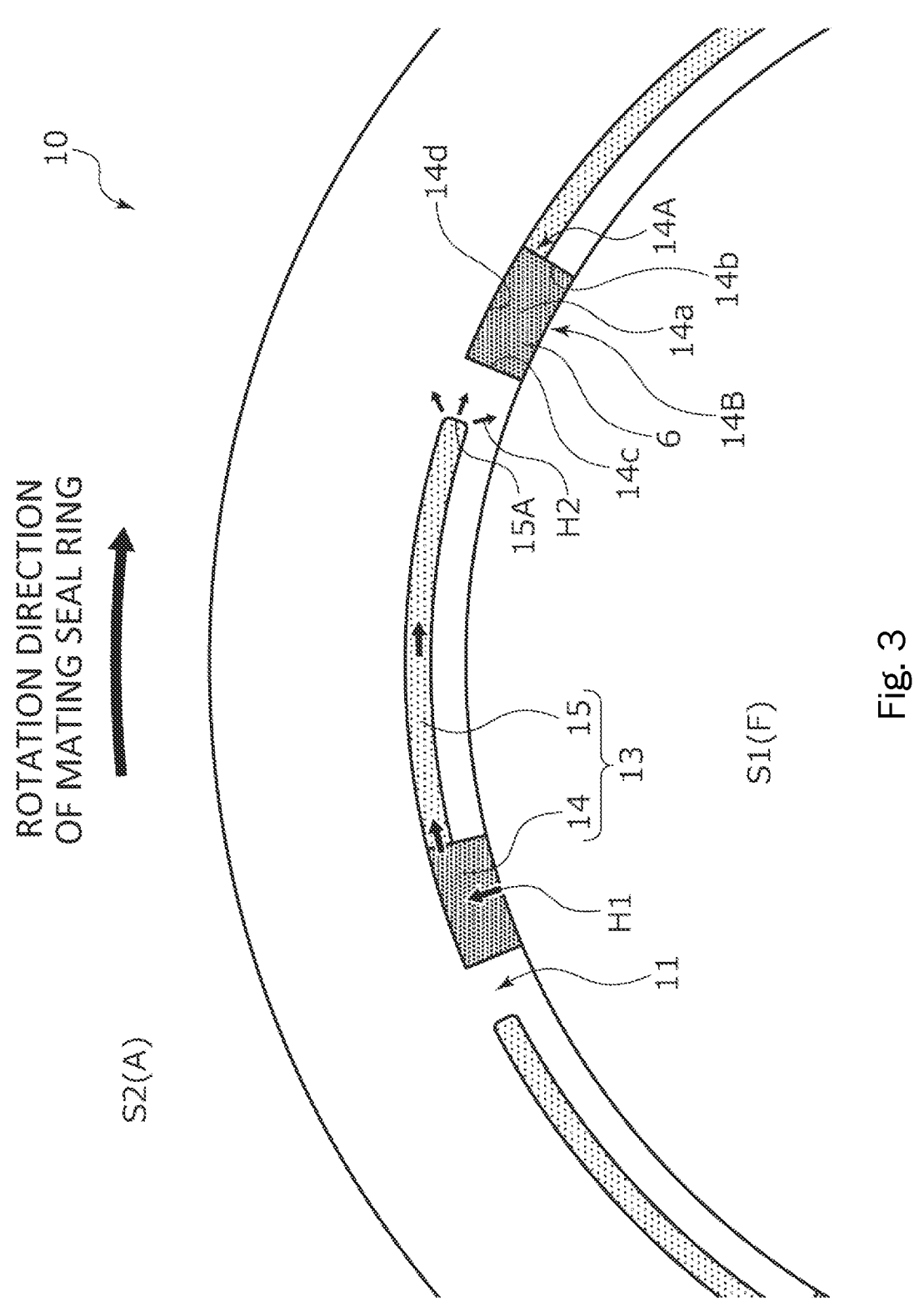
FIG. 3 is an enlarged view of the sliding surface of the stationary seal ring in the first embodiment when viewed in the axial direction.

As illustrated in FIGS. 2 and 3, the rotating seal ring 20 that is a mating seal ring slides clockwise relative to the stationary seal ring 10 as indicated by a solid arrow.

A plurality of dynamic pressure generation mechanisms 13 (eight in the present embodiment) are evenly arranged in a circumferential direction on the radially inner side of the sliding surface 11 of the stationary seal ring 10.

In addition, a portion of the sliding surface 11 other than the dynamic pressure generation mechanisms 13 is a land 12 forming a flat surface. The flat surface of the land 12 functions as a sliding surface that substantially slides against the sliding surface 21 of the rotating seal ring 20.

As illustrated in FIG. 3, each of the dynamic pressure generation mechanisms 13 includes a fluid inlet groove 14 and a Rayleigh step 15 as a dynamic pressure generation groove. The fluid inlet groove 14 extends in a radial direction so as to communicate with the inner space S1 and not to communicate with the outer space S2. The Rayleigh step 15 extends concentrically with the stationary seal ring 10 in the circumferential direction and in a clockwise direction from the radially outer side of the fluid inlet groove 14. A depth of the fluid inlet groove 14 is formed deeper than a depth of the Rayleigh step 15.

The fluid inlet groove 14 includes a bottom surface 14a, side surfaces 14b and 14c, and a radially outer-side end surface 14d. The bottom surface 14a extends parallel to the flat surface of the land 12 in the radial direction. The side surfaces 14b and 14c rise from both circumferential end edges of the bottom surface 14a. The radially outer-side end surface 14d rises from a radially outer end of the bottom surface 14a, and connects the side surfaces 14b and 14c. An opening 14A communicating with the Rayleigh step 15 is formed in the side surface 14b. In addition, an opening 14B communicating with the inner space S1 is formed on the radially inner side of the fluid inlet groove 14. Incidentally, the bottom surface 14a may be inclined toward the radially outer side so as to approach the land 12, namely, so as to become shallower.

Figure 4:
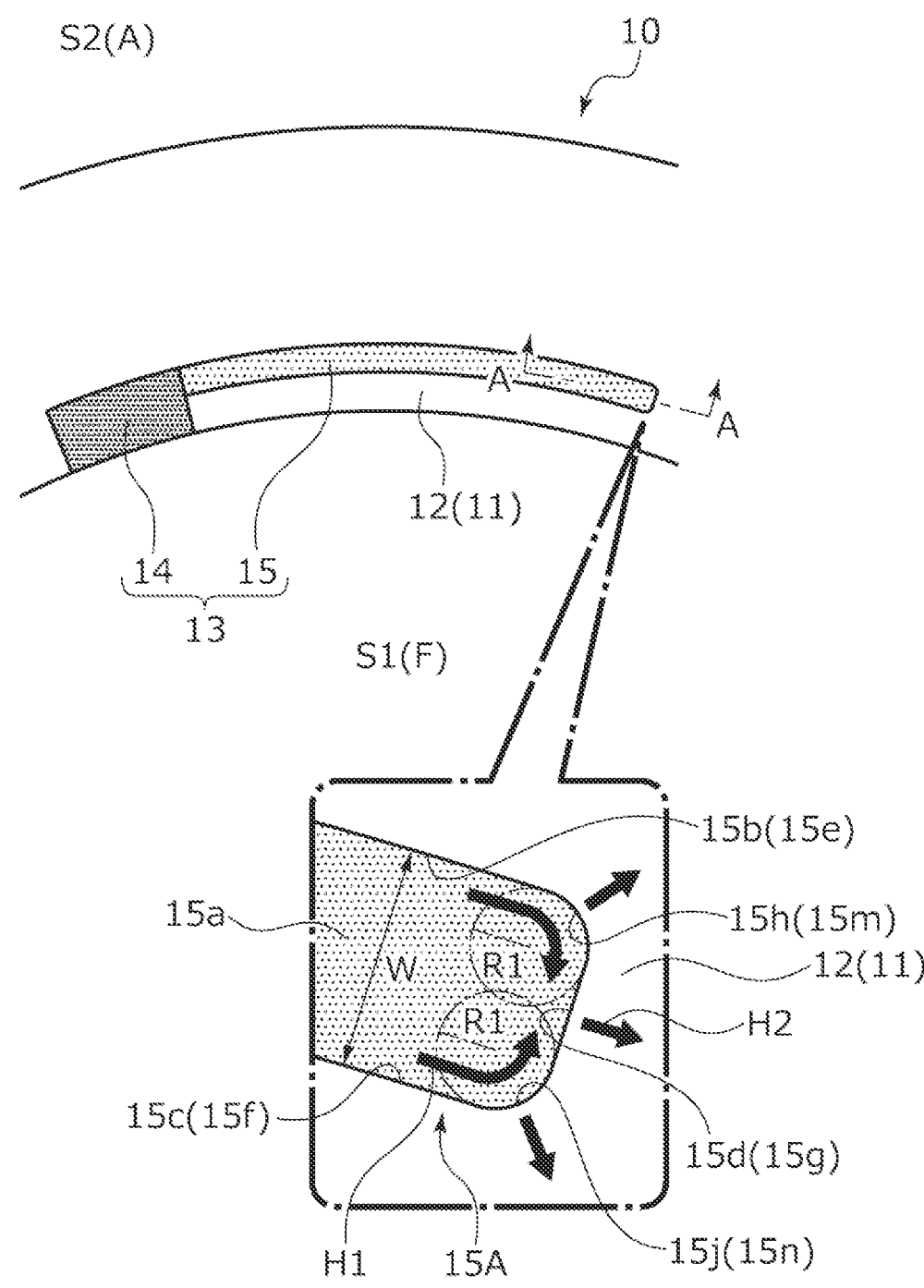
FIG. 4 is a plan view illustrating the shape of a closing end portion of a dynamic pressure generation groove in the first embodiment.
Figure 5:
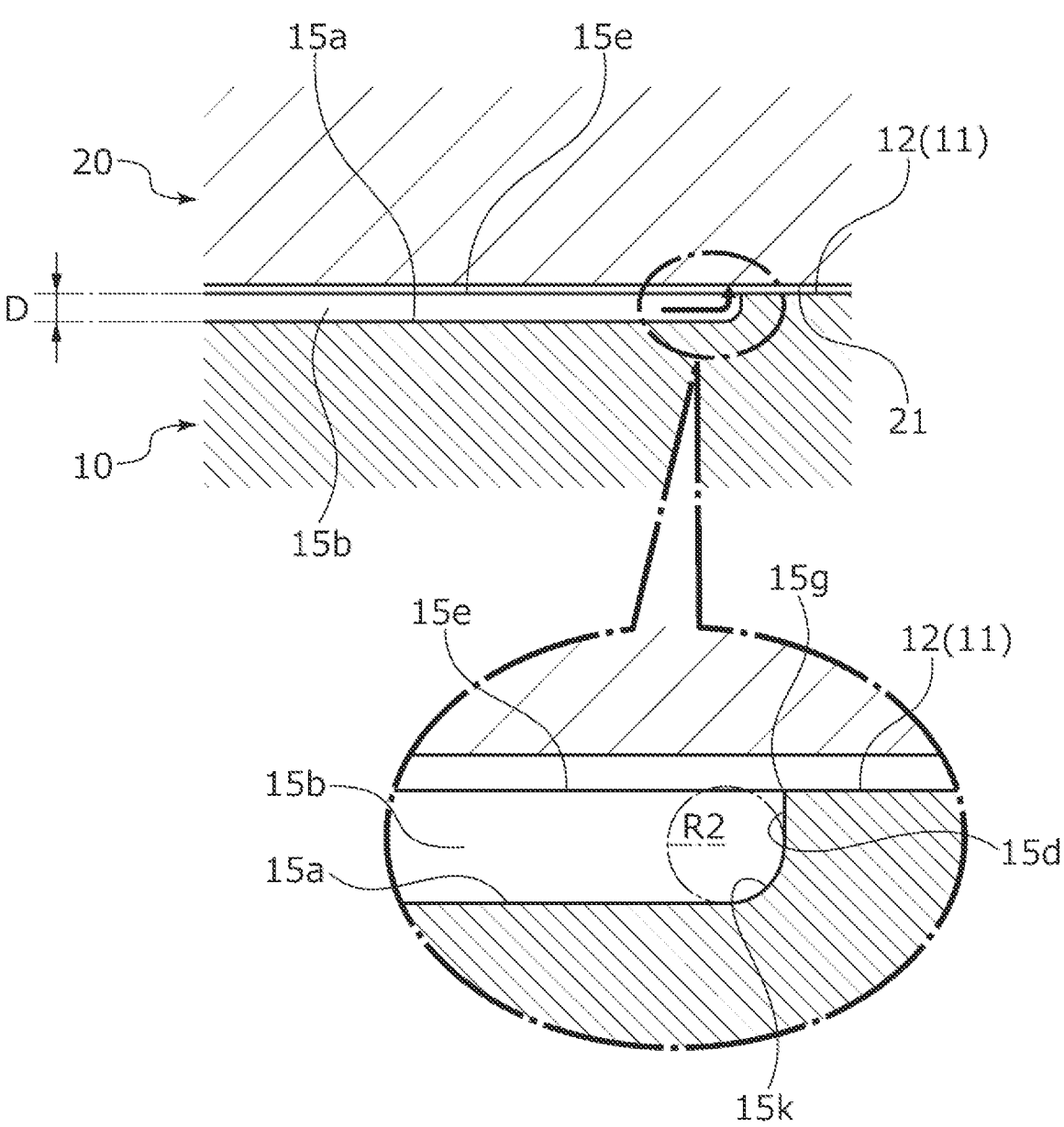
FIG. 5 is a cross-sectional view illustrating the shape of the closing end portion of the dynamic pressure generation groove in the first embodiment.

Referring to FIGS. 4 and 5, the Rayleigh step 15 mainly includes a bottom surface 15a; side surfaces 15b and 15c; and a terminating end surface 15d as a closing end surface on a downstream side of the relative rotation. The bottom surface 15a extends parallel to the flat surface of the land 12 in the radial direction. The side surfaces 15b and 15c rise from both circumferential end edges of the bottom surface 15a toward the flat surface of the land 12. The terminating end surface 15d on the downstream side of the relative rotation is continuous from the circumferential end edges of the bottom surface 15a to the side surfaces 15b and 15c. Hereinafter, a portion of the Rayleigh step 15 in the vicinity of the terminating end surface 15d is referred to as a terminating end portion 15A, and the terminating end portion 15A has a closed shape. Namely, the terminating end portion 15A functions as a closing end portion.

As illustrated in FIG. 4, the side surfaces 15b and 15c are arcuate surfaces mainly extending parallel to each other in a relative rotation direction, and the terminating end surface 15d is a flat surface mainly extending in a direction intersecting the relative rotation direction. A separation width between the side surfaces 15b and 15c, namely, a width dimension W of the Rayleigh step 15 in the radial direction is constant in the circumferential direction.

In addition, as illustrated in FIG. 5, a separation width between the bottom surface 15a and the flat surface of the land 12, namely, a depth dimension D of the Rayleigh step 15 is constant in the circumferential direction.

In addition, as illustrated in FIGS. 4 and 5, the depth dimension D of the Rayleigh step 15 is smaller than the width dimension W of the Rayleigh step 15 (D<W). It is preferable that the depth dimension D of the Rayleigh step 15 is sized to be equal to or less than $\frac{1}{10}$ of the width dimension W of the Rayleigh step 15.

The side surfaces 15b and 15c includes side edges 15e and 15f at upper ends thereof, in detail, at locations where the side surfaces 15b and 15c are connected to the flat surface of the land 12, and the terminating end surface 15d includes a terminating end edge 15g as a closing end edge at an upper end thereof, in detail, at a location where the terminating end surface 15d is connected to the flat surface of the land 12. In other words, the side surfaces 15b and 15c extend from the side edges 15e and 15f in a depth direction, and the terminating end surface 15d extends from the terminating end edge 15g in the depth direction.

Particularly, as illustrated in FIG. 4, the side edges 15e and 15f and the terminating end edge 15g are curved and continuous with each other in a plan view. In detail, the side surfaces 15b and 15c including the side edges 15e and 15f are continuous with both radial ends of the terminating end surface 15d including the terminating end edge 15g, through upper edges 15m and 15n of curved surfaces 15h and 15j having the same curvature radius R1 in a plan view. Incidentally, dash-dot line circles illustrated adjacent to the curved surfaces 15h and 15j are imaginary circles for describing the curvature radius R1. Furthermore, hereinafter, such imaginary circles as described above may be illustrated to describe a curvature radius.

The curved surface 15h on the radially outer side protrudes to the radially outer side on the downstream side of the relative rotation, namely, the radially outer side in the clockwise direction in a plan view. The curved surface 15j on the radially inner side protrudes to the radially inner side on the downstream side of the relative rotation, namely, the radially inner side in the clockwise direction in a plan view. In other words, the centers of curvature of the curved surfaces 15h and 15j are disposed inside the Rayleigh step 15.

In addition, particularly, as illustrated in FIG. 5, the bottom surface 15a and the terminating end surface 15d are curved and continuous with each other in a cross-sectional view. In detail, the bottom surface 15a and the terminating end surface 15d are continuous with each other through a curved surface 15k having a curvature radius R2 in a cross-sectional view. The curved surface 15k protrudes in the depth direction on the downstream side of the relative rotation, namely, in the clockwise direction and in a direction away from the sliding surface 21 of the rotating seal ring 20 in a cross-sectional view. In other words, the center of curvature of the curved surface 15k is disposed inside the Rayleigh step 15.

In addition, the curvature radius R1 of the curved surfaces 15h and 15j is larger than the curvature radius R2 of the curved surface 15k (R1>R2). Namely, the curved surfaces 15h and 15j are more gently curved than the curved surface 15k.

In addition, the curvature radius R1 is a dimension in the range of $\frac{1}{3}$ to 3 times the depth dimension D of the Rayleigh step 15.

In addition, the curvature radius R1 is 10 μm or more (R1≥10 μm).

Next, the operation of the stationary seal ring 10 and the rotating seal ring 20 during relative rotation will be described with reference to FIGS. 3 to 5. Incidentally, the flow of the sealed fluid F or the atmosphere A in FIG. 3 is schematically illustrated without specifying a relative rotation speed of the rotating seal ring 20.

First, when the rotating seal ring 20 is not in rotation and is stopped, the sealed fluid F flows into the fluid inlet groove 14. Incidentally, since the stationary seal ring 10 is biased to the rotating seal ring 20 side by the elastic member 7, the sliding surfaces 11 and 21 are in the state of contact with each other, and there is almost no leakage of the sealed fluid F between the sliding surfaces 11 and 21 to the outer space S2.

As illustrated in FIG. 3, in a state where the rotating seal ring 20 rotates relative to the stationary seal ring 10, the sealed fluid F inside the Rayleigh step 15 follows and moves in the rotation direction of the rotating seal ring 20 due to shear with the sliding surface 21, so that the sealed fluid F in the inner space S1 is drawn into the fluid inlet groove 14. Namely, inside the fluid inlet groove 14, as indicated by an arrow H1, the sealed fluid F moves from the fluid inlet groove 14 toward the terminating end portion 15A of the Rayleigh step 15 on the downstream side in the relative rotation direction.

The sealed fluid F that has moved toward the terminating end portion 15A of the Rayleigh step 15 is increased in pressure at the terminating end portion 15A of the Rayleigh step 15 and in the vicinity of the terminating end portion 15A. Namely, a positive pressure is generated at the terminating end portion 15A of the Rayleigh step 15 and in the vicinity thereof.

Since the depth of the Rayleigh step 15 is shallow, even when the movement amount of the sealed fluid F is small due to a low rotation speed of the rotating seal ring 20, a positive pressure is generated at the terminating end portion 15A of the Rayleigh step 15 and in the vicinity thereof.

In addition, the sliding surfaces 11 and 21 are slightly separated from each other by a force caused by the positive pressure generated at the terminating end portion 15A of the Rayleigh step 15 and in the vicinity thereof (refer to FIG. 5). Accordingly, the sealed fluid F inside the dynamic pressure generation mechanism 13 indicated by an arrow H2 mainly flows into a gap between the sliding surfaces 11 and 21. Since the sealed fluid F is interposed between the sliding surfaces 11 and 21 in such a manner, even during low-speed rotation, lubricity can be improved and wear between the sliding surfaces 11 and 21 can be suppressed. Incidentally, since the floating distance between the sliding surfaces 11 and 21 is slight, the amount of leakage of the sealed fluid F to the outer space S2 is small. In addition, since the fluid inlet groove 14 is provided, a large amount of the sealed fluid F can be held.

As illustrated in FIG. 4, the sealed fluid F moving along the side surfaces 15b and 15c at the terminating end portion 15A of the Rayleigh step 15 moves along the curved surfaces 15h and 15j that are curved in a plan view, a fraction of the sealed fluid F flows into the gap between the sliding surfaces 11 and 21 over the curved surfaces 15h and 15j, and the other fraction is collected at a center portion in a width direction of the Rayleigh step 15 and flows into the gap between the sliding surfaces 11 and 21 over the terminating end surface 15d.

In addition, microscopically, in a plan view, the point where the sealed fluid F reaches the highest pressure at the terminating end portion 15A changes over time in the width direction. Since the sealed fluid F moves along the curved surfaces 15h and 15j and the terminating end surface 15d, and the curved surfaces 15h and 15j and the terminating end surface 15d are smoothly connected to each other, contamination is easily discharged into the gap between the sliding surfaces 11 and 21 without stagnation.

In addition, as illustrated in FIG. 5, since the bottom surface 15a and the terminating end surface 15d are continuous with each other through the curved surface 15k, the sealed fluid F can smoothly move toward the gap between the sliding surfaces 11 and 21.

As described above, the side edges 15e and 15f and the terminating end edge 15g of the Rayleigh step 15 are continuous with each other through the curved surfaces 15h and 15j that are curved in a plan view. According to this configuration, at the terminating end portion 15A of the Rayleigh step 15, since the sealed fluid F smoothly moves along the curved surfaces 15h and 15j continuous with the side edges 15e and 15f and the terminating end edge 15g, contamination contained in the sealed fluid F can be discharged from inside the Rayleigh step 15 into the gap between the sliding surfaces 11 and 21 without accumulating at the terminating end portion 15A of the Rayleigh step 15.

In other words, since corner portions are not formed between the side edges 15e and 15f and the terminating end edge 15g in a plan view, a vortex is less likely to occur between the side edges 15e and 15f and the terminating end edge 15g at the terminating end portion 15A of the Rayleigh step 15, and the formation of a region where contamination is likely to accumulate at the terminating end portion 15A of the Rayleigh step 15 can be suppressed.

In addition, since the side surfaces 15b and 15c extending from the side edges 15e and 15f toward the bottom surface 15a in the depth direction and the terminating end surface 15d extending from the terminating end edge 15g toward the bottom surface 15a in the depth direction are curved and continuous with each other, the sealed fluid F can be smoothly moved in the depth direction of the terminating end portion 15A of the Rayleigh step 15.

In addition, both the side surfaces 15b and 15c and the terminating end surface 15d are continuous with each other through the curved surfaces 15h and 15j having one curvature radius R1 in a plan view. According to this configuration, contamination can be smoothly moved along the curved surfaces 15h and 15j having one curvature, and can be collected at the center portion of the Rayleigh step 15 in the width direction while a fraction of the contamination is discharged from the side surfaces 15b and 15c into the gap between the sliding surfaces 11 and 21, and the remaining fraction can be discharged from the terminating end surface 15d into the gap between the sliding surfaces 11 and 21.

In addition, the bottom surface 15a and the terminating end surface 15d forming the Rayleigh step 15 are curved and continuous with each other in a cross-sectional view. According to this configuration, in the vicinity of the terminating end surface 15d, since the movement of the sealed fluid F toward the gap between the sliding surfaces 11 and 21 is guided by the curved surface 15k between the bottom surface 15a and the terminating end surface 15d, contamination is easily discharged into the gap between the sliding surfaces 11 and 21. In other words, the accumulation of contamination at a boundary portion between the bottom surface 15a and the terminating end surface 15d can be suppressed.

In addition, the Rayleigh step 15 extends in the circumferential direction from the fluid inlet groove 14 communicating with the inner space S1 and not communicating with the outer space S2. According to this configuration, the sealed fluid F is allowed to stably flow from the fluid inlet groove 14 that is a groove deeper than the Rayleigh step 15, to the Rayleigh step 15.

Incidentally, in the first embodiment, a mode in which the curved surfaces 15h and 15j are formed in an arcuate shape having one curvature radius R1 in a plan view has been provided as an example; however, the curved surfaces 15h and 15j may have the shape of a part of a parabola, a part of an ellipse, a part of a sine wave, or the like in a plan view.

Incidentally, in the first embodiment, a mode in which the curved surface 15k is formed in an arcuate shape having one curvature radius R2 in a cross-sectional view has been provided as an example; however, the curved surface 15k may have the shape of a part of a parabola, a part of an ellipse, a part of a sine wave, or the like in a cross-sectional view.

Second Embodiment

Figure 6:
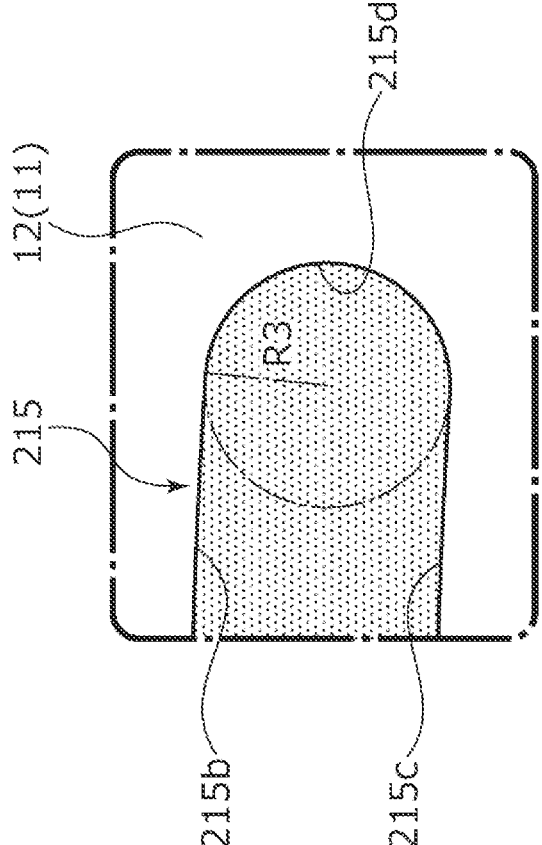
FIG. 6 is a plan view illustrating the shape of a closing end portion of a dynamic pressure generation groove of a sliding component according to a second embodiment of the present invention.

Next, a sliding component according to a second embodiment of the present invention will be described with reference to FIG. 6. Incidentally, the descriptions of configurations that are the same as and overlap with the configurations of the first embodiment will be omitted.

A terminating end surface 215d of a Rayleigh step 215 of the second embodiment has a substantially semicircular shape in a plan view. In detail, the terminating end surface 215d has one curvature radius R3, and is continuous with side surfaces 215b and 215c.

According to this configuration, the sealed fluid F moving along the side surfaces 215b and 215c of the Rayleigh step 215 is discharged into the gap between the sliding surfaces 11 and 21 over the terminating end surface 215d by the terminating end surface 215d (refer to FIG. 5) while smoothly moving toward a center portion of the Rayleigh step 215 in the width direction.

Third Embodiment

Figure 7:
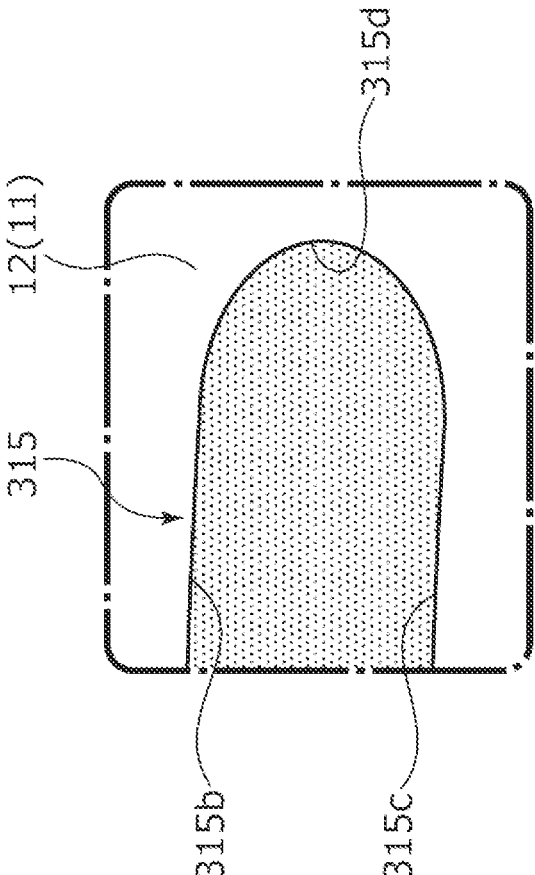
FIG. 7 is a plan view illustrating the shape of a closing end portion of a dynamic pressure generation groove of a sliding component according to a third embodiment of the present invention.

Next, a sliding component according to a third embodiment of the present invention will be described with reference to FIG. 7. Incidentally, the descriptions of configurations that are the same as and overlap with the configurations of the first embodiment will be omitted.

A terminating end surface 315d of a Rayleigh step 315 of the third embodiment has a substantially semi-elliptical shape in a plan view, and is continuous with side surfaces 315b and 315c. According to this configuration, the sealed fluid F moving along the side surfaces 315b and 315c of the Rayleigh step 315 is discharged into the gap between the sliding surfaces 11 and 21 over the terminating end surface 315d by the terminating end surface 315d (refer to FIG. 5) while smoothly moving toward a center portion of the Rayleigh step 315 in the width direction. In addition, since the curvature radius of a final end portion disposed on the furthest downstream side of the relative rotation is smaller compared to the Rayleigh step 215 of the second embodiment, a shape in which a positive pressure is likely to be generated at the final end portion is obtained.

Fourth Embodiment

Figure 8:
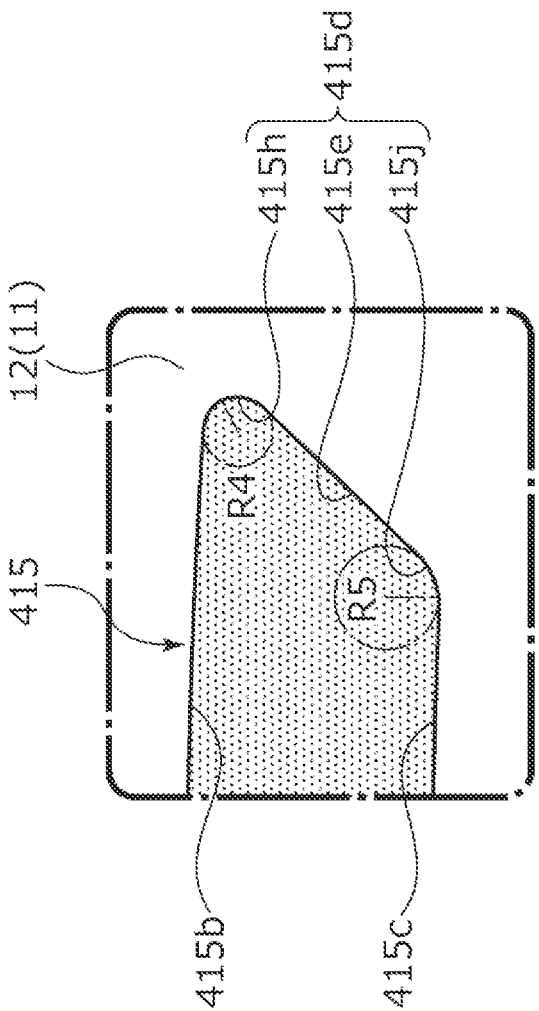
FIG. 8 is a plan view illustrating the shape of a closing end portion of a dynamic pressure generation groove of a sliding component according to a fourth embodiment of the present invention.

Next, a sliding component according to a fourth embodiment of the present invention will be described with reference to FIG. 8. Incidentally, the descriptions of configurations that are the same as and overlap with the configurations of the first embodiment will be omitted.

In a Rayleigh step 415 of the fourth embodiment, a side surface 415b on the radially outer side extends further to the downstream side in the relative rotation direction than a side surface 415c on the radially inner side. A terminating end surface 415d includes an inclined surface portion 415e, a curved surface portion 415h, and a curved surface portion 415j. The inclined surface portion 415e extends linearly in the radial direction while being inclined in the circumferential direction to connect the side surfaces 415b and 415c. The curved surface portion 415h connects the side surface 415b and the inclined surface portion 415e. The curved surface portion 415j connects the side surface 415c and the inclined surface portion 415e.

The curved surface portion 415h on the radially outer side has one curvature radius R4, and the curved surface portion 415j on the radially inner side has one curvature radius R5 larger than the curvature radius R4 (R4<R5).

During relative rotation, the sealed fluid F inside the Rayleigh step 415 is guided to the radially outer side by the inclined surface portion 415e of the terminating end surface 415d, and is mainly discharged from the vicinity of the curved surface portion 415h into the gap between the sliding surfaces 11 and 21 (refer to FIG. 5).

Since the curvature radius R4 of the curved surface portion 415h is smaller than the curvature radius R5 of the curved surface portion 415j, a positive pressure is more likely to be generated in the vicinity of the curved surface portion 415h than at the curved surface portion 415j. In addition, since the curved surface portion 415j is more gently curved than the curved surface portion 415h, the sealed fluid F can be smoothly moved toward the inclined surface portion 415e while suppressing the generation of a positive pressure at the curved surface portion 415j.

Fifth Embodiment

Figure 9:
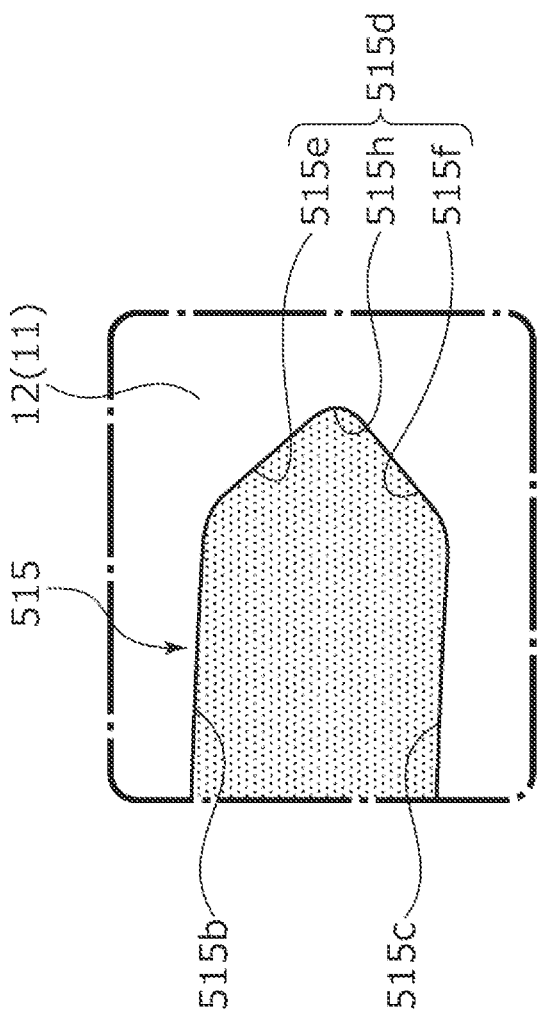
FIG. 9 is a plan view illustrating the shape of a closing end portion of a dynamic pressure generation groove of a sliding component according to a fifth embodiment of the present invention.

Next, a sliding component according to a fifth embodiment of the present invention will be described with reference to FIG. 9. Incidentally, the descriptions of configurations that are the same as and overlap with the configurations of the first embodiment will be omitted.

A terminating end surface 515d of a Rayleigh step 515 of the fifth embodiment includes a first inclined surface portion 515e, a second inclined surface portion 515f, and a curved surface portion 515h. The first inclined surface portion 515e extends linearly from a side surface 515b while being inclined to the radially inner side on the downstream side of the relative rotation. The second inclined surface portion 515f extends linearly from a side surface 515c while being inclined to the radially outer side on the downstream side of the relative rotation. The curved surface portion 515h is continuous with end portions of the first inclined surface portion 515e and the second inclined surface portion 515f on the downstream side in the circumferential direction.

During relative rotation, the sealed fluid F inside the Rayleigh step 515 is guided toward the first inclined surface portion 515e and the curved surface portion 515h of the terminating end surface 515d by the side surface 515b and the second inclined surface portion 515f, and is mainly discharged into the gap between the sliding surfaces 11 and 21 over the first inclined surface portion 515e and the curved surface portion 515h (refer to FIG. 5).

In addition, since a boundary portion between the side surface 515b and the first inclined surface portion 515e and a boundary portion between the side surface 515c and the second inclined surface portion 515f are curved, and the sealed fluid F smoothly move along the boundary portions, the accumulation of contamination can be suppressed. Incidentally, the boundary portion between the side surface 515b and the first inclined surface portion 515e and the boundary portion between the side surface 515c and the second inclined surface portion 515f may be continuous at an obtuse angle.

Sixth Embodiment

Next, a sliding component according to a sixth embodiment of the present invention will be described with reference to FIG. 10. Incidentally, the descriptions of configurations that are the same as and overlap with the configurations of the first embodiment will be omitted.

A plurality of the dynamic pressure generation mechanisms 13 and a plurality of spiral grooves 16 are provided on the sliding surface 11 of a stationary seal ring 10' of the sixth embodiment. The dynamic pressure generation mechanisms 13 have the same configuration as those of the mechanical seal of the first embodiment.

The spiral grooves 16 are evenly arranged in the circumferential direction on the radially outer side of the sliding surface 11. A portion of the sliding surface 11 other than the dynamic pressure generation mechanisms 13 and the spiral grooves 16 is the land 12 forming a flat surface. In detail, the land 12 includes land portions between the dynamic pressure generation mechanisms 13 adjacent to each other in the circumferential direction; land portions between the spiral grooves 16 adjacent to each other in the circumferential direction; and land portions between the dynamic pressure generation mechanisms 13 and the spiral grooves 16 separated from each other in the radial direction, and the land portions are disposed on the same plane to form the flat surface of the land 12.

The spiral grooves 16 extend in an arcuate shape from the radially outer side toward the radially inner side while being inclined with a clockwise component. The spiral grooves 16 communicate with the outer space S2, and do not communicate with the inner space S1.

The spiral grooves 16 are formed with a constant depth in the circumferential direction. Incidentally, the spiral grooves 16 are not limited to extending in an arcuate shape while being inclined, and may extend linearly.

The spiral groove 16 includes a bottom surface 16*a*, side surfaces 16*b* and 16*c*, and an end surface 16*d*. The bottom surface 16*a* extends parallel to the flat surface of the land 12 in the radial direction. The side surfaces 16*b* and 16*c* rise from both circumferential end edges of the bottom surface 16*a*. The end surface 16*d* connects radially inner ends of the bottom surface 16*a* and the side surfaces 16*b* and 16*c*. An opening 16A communicating with the outer space S2 is formed on the radially outer side of the spiral groove 16.

Next, the operation of the stationary seal ring 10' and the rotating seal ring 20 during relative rotation will be described.

At low speed immediately after the rotating seal ring 20 starts rotating relative to the stationary seal ring 10', as described above, a positive pressure is generated at the end portion 15A of the Rayleigh step 15 and in the vicinity of the end portion 15A.

On the other hand, in the spiral groove 16, during low-speed relative rotation of the rotating seal ring 20 and the stationary seal ring 10', the atmosphere A is not sufficiently dense inside the spiral groove 16, and a high positive pressure is not generated, and a force caused by the positive pressure generated by the spiral groove 16 is relatively smaller than a force caused by the positive pressure generated at the terminating end portion 15A of the Rayleigh step 15 and in the vicinity thereof. Therefore, during low-speed rotation of the rotating seal ring 20, the force caused by the positive pressure generated at the terminating end portion 15A of the Rayleigh step 15 and in the vicinity thereof mainly acts to separate the sliding surfaces 11 and 21 from each other.

Figure 10:
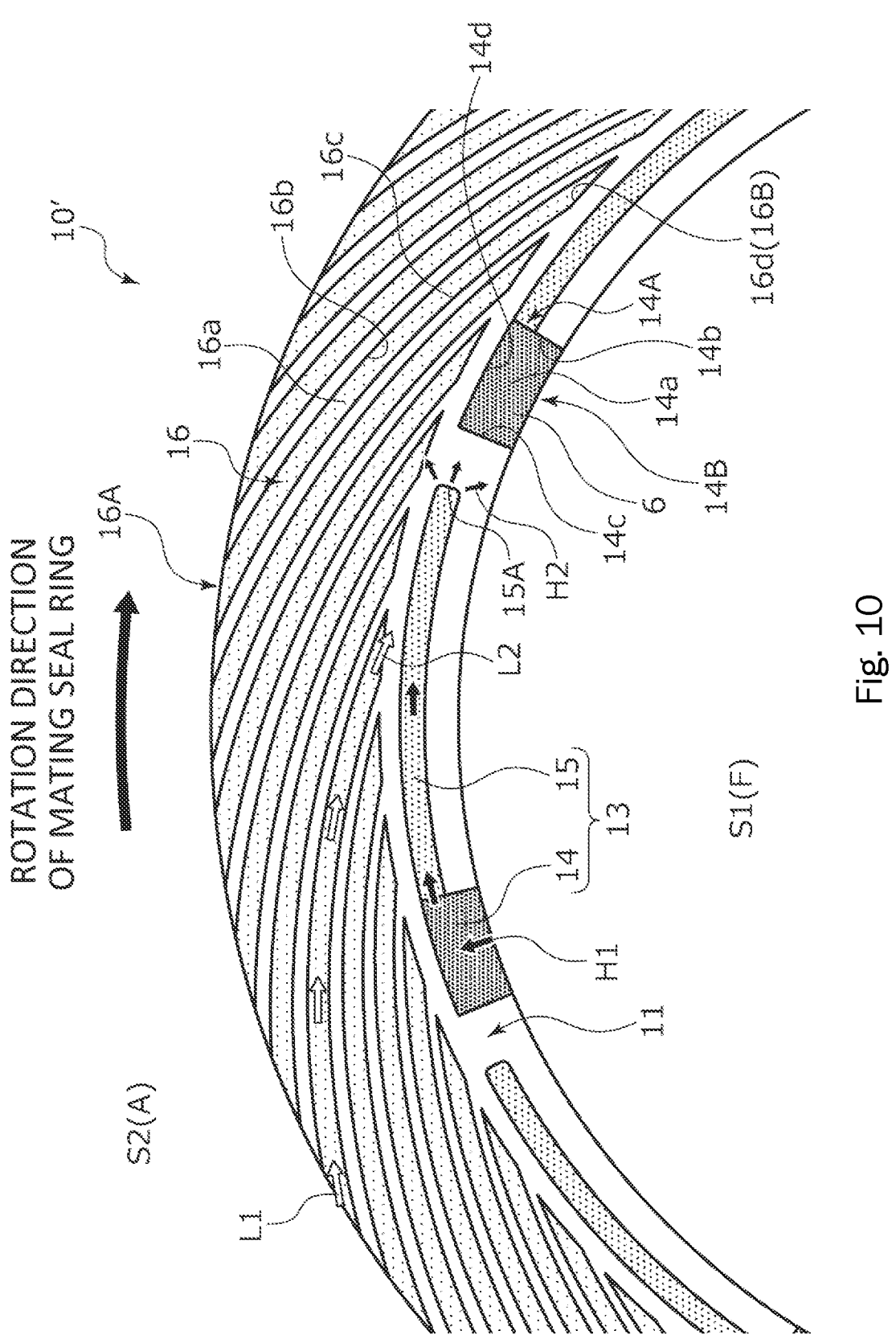
FIG. 10 is an enlarged view of a sliding surface of a stationary seal ring as a sliding component according to a sixth embodiment of the present invention when viewed in the axial direction.

When the relative rotation speed of the rotating seal ring 20 increases, as illustrated in FIG. 10, the atmosphere A inside the spiral groove 16 follows and moves in the rotation direction of the rotating seal ring 20 due to shear with the sliding surface 21, and the atmosphere A in the outer space S2 is drawn into the spiral groove 16. Namely, inside the spiral groove 16, as indicated by an arrow L1, a large amount of the atmosphere A moves from the opening 16A on the radially outer side toward a radially inner-side end portion 16B.

The atmosphere A that has moved toward the radially inner-side end portion 16B of the spiral groove 16 is increased in pressure at the radially inner-side end portion 16B of the spiral groove 16 and in the vicinity of the radially inner-side end portion 16B. Namely, a positive pressure is generated at the radially inner-side end portion 16B of the spiral groove 16 and in the vicinity thereof.

In such a manner, the force caused by the positive pressure generated at the radially inner-side end portion 16B of the spiral groove 16 and in the vicinity thereof is added to the force caused by the positive pressure generated at the terminating end portion 15A of the Rayleigh step 15 and in the vicinity thereof, and the sliding surfaces 11 and 21 are further separated from each other compared to when the speed is low. Accordingly, the atmosphere A inside the spiral groove 16 indicated by an arrow L2 mainly flows into the gap between the sliding surfaces 11 and 21.

Since the atmosphere A inside the spiral groove 16 indicated by the arrow L2 acts to push the sealed fluid F in the vicinity of the radially inner-side end portion 16B of the spiral groove 16 back to an inner space S1 side, the amount of leakage of the sealed fluid F into the spiral groove 16 or the outer space S2 is small.

Since the mechanical seal of the present embodiment is designed such that during high-speed rotation, a positive pressure generation capability by all the spiral grooves 16 is sufficiently greater than a positive pressure generation capability by all the dynamic pressure generation mechanisms 13, finally, a state where only the atmosphere A exists between the sliding surfaces 11 and 21, namely, gas lubrication is achieved.

In addition, the sealed fluid F in the inner space S1 that is, for example, as a sealed fluid side space is a liquid, and the fluid in the outer space S2 that is, for example, as a leakage side space is the atmosphere A, namely, a gas. During low-speed rotation, lubrication between the sliding surfaces 11 and 21 can be performed by the liquid, and during high-speed rotation, lubrication between the sliding surfaces 11 and 21 can be performed by the gas. In other words, lubrication between the sliding surfaces 11 and 21 can be appropriately performed according to the relative rotation speed between the stationary seal ring 10' and the rotating seal ring 20.

Seventh Embodiment

Figure 11:
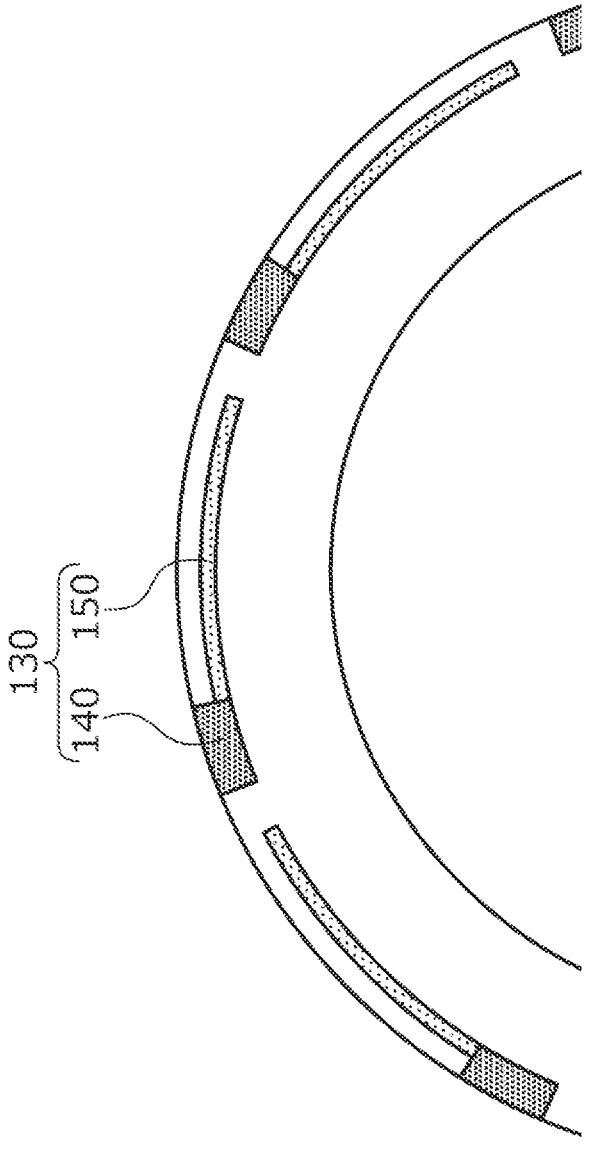
FIG. 11 is an enlarged view of a sliding surface of a stationary seal ring as a sliding component according to a seventh embodiment of the present invention when viewed in the axial direction.

Next, a mechanical seal including a sliding component according to a seventh embodiment of the present invention will be described with reference to FIG. 11. Incidentally, the descriptions of configurations that are the same as and overlap with the configurations of the first embodiment will be omitted.

In the mechanical seal of the seventh embodiment, dynamic pressure generation mechanisms 130, each including a fluid inlet groove 140 and a dynamic pressure generation groove 150, are formed on the radially outer side of the sliding surface of the stationary seal ring. Since the operation of the stationary seal ring 10 and the rotating seal ring 20 during relative rotation is substantially the same as in the first embodiment except that inner and outer diameters are changed, the description thereof will be omitted.

Eighth Embodiment

Figure 12:
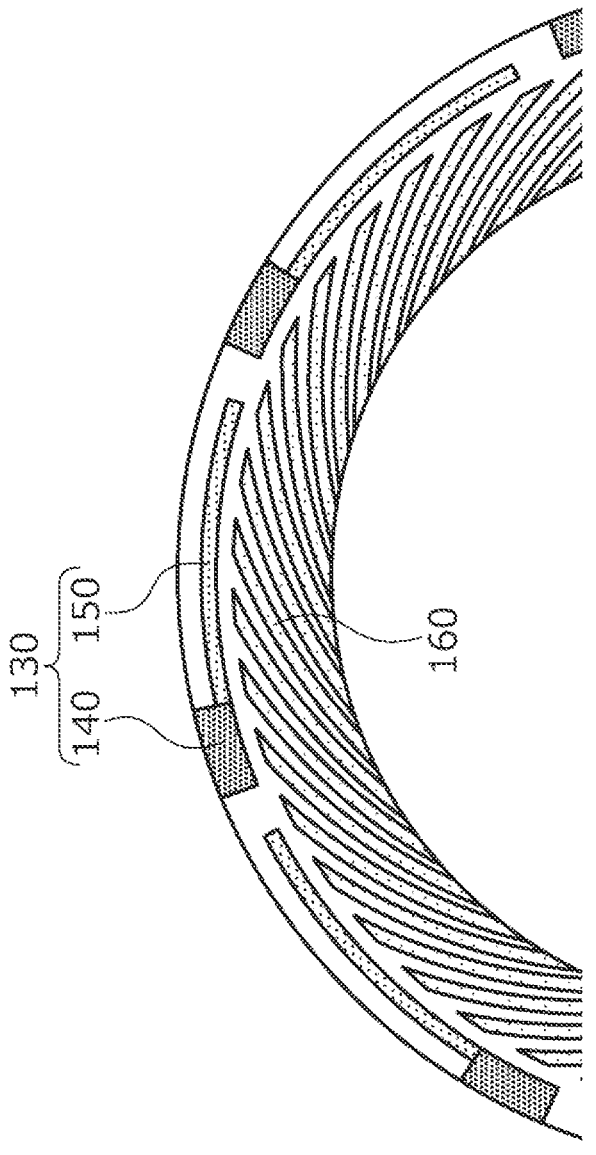
FIG. 12 is an enlarged view of a sliding surface of a stationary seal ring as a sliding component according to an eighth embodiment of the present invention when viewed in the axial direction.

Next, a mechanical seal including a sliding component according to an eighth embodiment of the present invention will be described with reference to FIG. 12. Incidentally, the descriptions of configurations that are the same as and overlap with the configurations of the sixth embodiment will be omitted.

In the mechanical seal of the eighth embodiment, the dynamic pressure generation mechanisms 130, each including the fluid inlet groove 140 and the dynamic pressure generation groove 150, are formed on the radially outer side of the sliding surface of the stationary seal ring, and spiral grooves 160 are formed on the radially inner side. Since the operation of the stationary seal ring 10 and the rotating seal ring 20 during relative rotation is substantially the same as in the sixth embodiment except that inner and outer diameters are changed, the description thereof will be omitted.

The embodiments of the present invention have been described above with reference to the drawings; however, the specific configurations are not limited to the embodiments, and modifications or additions that are made without departing from the scope of the present invention are included in the present invention.

For example, in the embodiments, the mechanical seals for automobiles have been described as examples of the sliding component; however, the sliding component may be other mechanical seals for general industrial machines or the like.

In addition, in the first to eighth embodiments, an example in which the dynamic pressure generation grooves and the fluid inlet grooves are provided in the stationary seal ring has been described; however, the dynamic pressure generation grooves and the fluid inlet grooves may be provided in the rotating seal ring. In other words, the sliding component of the present invention may be the stationary seal ring or the rotating seal ring.

In addition, in the first to eighth embodiments, the sealed fluid side and the leakage side have been described as a high-pressure side and a low-pressure side, respectively; however, the sealed fluid side and the leakage side may have substantially the same pressure. When the sealed fluid side and the leakage side have substantially the same pressure, it is preferable that the dynamic pressure generation grooves on the leakage side are formed deeper than the fluid inlet grooves on the sealed fluid side, during low-speed rotation, a positive pressure is generated in the fluid inlet grooves, and during high-speed rotation, a positive pressure is generated in the dynamic pressure generation grooves.

In addition, in the first to eighth embodiments, the sealed fluid F has been described as a high-pressure liquid, but is not limited thereto, and may be a gas or a low-pressure liquid or may be in the form of a mist that is a mixture of liquid and gas.

In addition, in the first to eighth embodiments, the fluid on the leakage side has been described as the atmosphere A that is a low-pressure gas, but is not limited thereto, and may be a liquid or a high-pressure gas or may be in the form of a mist that is a mixture of liquid and gas.

In addition, in the first to eighth embodiments, a mode in which the fluid inlet grooves and the dynamic pressure generation grooves are provided to communicate with the space S1 on a sealed fluid F side has been provided as an example; however, the present invention is not limited thereto, the fluid inlet grooves and the dynamic pressure generation grooves may be provided to communicate with the space S2 on the leakage side.

In addition, in the first to eighth embodiments, a mode in which the Rayleigh step extends in an arcuate shape has been provided as an example; however, the Rayleigh step may extend linearly. In addition, the Rayleigh step is not limited to being provided concentrically with the stationary seal ring, and may be inclined in the circumferential direction. Namely, the side surfaces may mainly extend in the relative rotation direction, and the closing end surface may mainly extend in the direction intersecting the relative rotation direction.

In addition, in the first to eighth embodiments, a mode in which both side surfaces of the Rayleigh step extend vertically from both side edges in the depth direction has been provided as an example; however, for example, the Rayleigh step may be inclined such that the width between both the side surfaces becomes narrower from both the side edges in the depth direction.

In addition, in the first to eighth embodiments, a mode in which the closing end surface of the Rayleigh step extends vertically from the closing end edge to the curved surface on a bottom surface side has been provided as an example; however, for example, the closing end surface of the Rayleigh step may extend to the curved surface on the bottom surface side while being inclined to become shallower from the closing end edge toward an upstream side of the relative rotation.

In addition, in the first to eighth embodiments, a mode in which the bottom surface of the Rayleigh step extends parallel to the flat surface of the land has been provided as an example; however, the present invention is not limited thereto, and for example, the bottom surface of the Rayleigh step may be inclined to become shallower toward the closing end surface.

In addition, in the first to eighth embodiments, even when the rotating seal ring 20 rotates counterclockwise, and a relative negative pressure is generated, the sealed fluid F flowing from the land into the closing end portion of the Rayleigh step 15 moves along the curved surface and makes it difficult for contamination to accumulate at the closing end portion. In addition, microscopically, in a plan view, since the point where the sealed fluid F reaches the highest pressure at the closing end portion changes over time in the width direction, and the closing end portion is smoothly connected, contamination is less likely to stagnate.

REFERENCE SIGNS LIST

1 Rotating shaft
2 Sleeve
4 Housing
10 Stationary seal ring (sliding component)
11 Sliding surface
12 Land
13 Dynamic pressure generation mechanism
14 Fluid inlet groove
15 Rayleigh step (dynamic pressure generation groove)
15A Terminating end portion (closing end portion)
15a Bottom surface
15b, 15c Side surface
15d Terminating end surface (closing end surface)
15e, 15f Side edge
15g Terminating end edge (closing end edge)
15h to 15k Curved surface
16 Dynamic pressure generation groove (spiral groove)
20 Rotating seal ring (another sliding component)
21 Sliding surface
130 Dynamic pressure generation mechanism
140 Fluid inlet groove
150 Dynamic pressure generation groove
160 Dynamic pressure generation groove (spiral groove)
215 Rayleigh step (dynamic pressure generation groove)
215b, 215c Side surface 215*d* Terminating end surface (closing end surface)
315 Rayleigh step (dynamic pressure generation groove)
315*b*, 315*c* Side surface
315*d* Terminating end surface (closing end surface)
415 Rayleigh step (dynamic pressure generation groove)
415*b*, 415*c* Side surface
415*d* Terminating end surface (closing end surface)
515 Rayleigh step (dynamic pressure generation groove)
515*b*, 515*c* Side surface
515*d* Terminating end surface (closing end surface)
A Atmosphere
F Sealed fluid
R1 to R5 Curvature radius
S1 Inner space (sealed fluid side space)
S2 Outer space (leakage side space)

The invention claimed is:

1. A sliding component which is disposed at a relative rotational location of a rotating machine to slide relative to another sliding component, the sliding component having a sliding surface provided with:

a plurality of fluid inlet grooves each communicating with at least one of a sealed fluid side space and a leakage side space; and a plurality of dynamic pressure generation grooves each having one end which communicates with the fluid inlet groove and other end which is a closed end, and extending from the one end to the closed end in a circumferential direction, wherein both side edges and a closing end edge of each of the dynamic pressure generation grooves are curvedly continuous with each other in a plan view, and the closed end of one of adjacent two of the dynamic pressure generation grooves overlaps, in a view of the circumferential direction, with the fluid inlet groove communicating with remaining one of the adjacent two of the dynamic pressure generation grooves on a downstream side of relative rotation direction.

2. The sliding component according to claim 1, wherein side surfaces of the dynamic pressure generation groove extending from the side edges in a depth direction and a closing end surface of the dynamic pressure generation groove extending from the closing end edge in the depth direction are curvedly continuous with each other.

3. The sliding component according to claim 2, wherein both the side surfaces and the closing end surface are continuous with each other through a curved surface having a curvature radius in a plan view.

4. The sliding component according to claim 3, wherein the closing end surface and a bottom surface of the dynamic pressure generation groove are curvedly continuous with each other in a cross-sectional view.

5. The sliding component according to claim 2, wherein the closing end surface is a curved surface having a curvature radius.

6. The sliding component according to claim 5, wherein the closing end surface and a bottom surface of the dynamic pressure generation groove are curvedly continuous with each other in a cross-sectional view.

7. The sliding component according to claim 2, wherein the closing end surface and a bottom surface of the dynamic pressure generation groove are curvedly continuous with each other in a cross-sectional view.

8. The sliding component according to claim 1, wherein the fluid inlet groove communicates with the sealed fluid side space, and the sliding surface is further provided with a spiral groove communicating with the leakage side space and not communicating with the sealed fluid side space.

9. A sliding component which is disposed at a relative rotational location of a rotating machine to slide relative to another sliding component, the sliding component having a sliding surface provided with:

a fluid inlet groove communicating with at least one of a sealed fluid side space and a leakage side space; and a dynamic pressure generation groove communicating with the fluid inlet groove and extending in a circumferential direction, wherein both side edges of the dynamic pressure generation groove are connected to each other by a closing end edge which is formed in a semi-elliptical shape in a plan view.

10. A sliding component which is disposed at a relative rotational location of a rotating machine to slide relative to another sliding component, the sliding component having a sliding surface provided with:

a fluid inlet groove communicating with at least one of a sealed fluid side space and a leakage side space; and a dynamic pressure generation groove communicating with the fluid inlet groove and extending in a circumferential direction, wherein the dynamic pressure generation groove has a first side edge disposed on a leakage side in a plan view and a second side edge disposed on a sealed fluid side, and a closing end edge on a terminal end side, the first side edge and the closing end edge are connected to each other by a first arc in the plan view, the second side edge and the closing end edge are connected to each other by a second arc in the plan view.

11. The sliding component according to claim 10, wherein the first arc has a curvature radius which is different from a curvature radius of the second arc.

12. The sliding component according to claim 11, wherein the first arc has a curvature radius which is smaller than a curvature radius of the second arc.

13. A sliding component which is disposed at a relative rotational location of a rotating machine to slide relative to another sliding component, the sliding component having a sliding surface provided with:

a fluid inlet groove communicating with at least one of a sealed fluid side space and a leakage side space; and a dynamic pressure generation groove communicating with the fluid inlet groove and extending in a circumferential direction, wherein both side edges and a closing end edge of the dynamic pressure generation groove are curvedly continuous with each other in a plan view, the closing end edge is formed by a pair of inclined straight lines and a curved line connecting the pair of inclined straight line in the plan view.

14. A sliding component which is disposed at a relative rotational location of a rotating machine to slide relative to another sliding component, the sliding component having a sliding surface provided with:

a fluid inlet groove communicating with at least one of a sealed fluid side space and a leakage side space; and a dynamic pressure generation groove communicating with the fluid inlet groove and extending in a circumferential direction, wherein both side edges and a closing end edge of the dynamic pressure generation groove are curvedly continuous with each other in a plan view, and the dynamic pressure generation groove has both side walls which are erected from a bottom surface of the dynamic pressure generation groove and extend from both side edges in a depth direction.

* * * * *